DIODE AND CONTACT STRUCTURE

Filed May 17, 1961

LAWRENCE F. PUNTE
BASIL WEIR
HERBERT V. WONG
INVENTORS

BY

Lippincott, Ralls & Hendricson
ATTORNEYS

United States Patent Office 3,227,933
Patented Jan. 4, 1966

3,227,933
DIODE AND CONTACT STRUCTURE

Lawrence F. Punte, San Rafael, Basil Weir, Mill Valley, and Herbert V. Wong, San Francisco, Calif., assignors, by mesne assignments, to Fairchild Camera and Instrument Corporation, Syosset, N.Y., a corporation of Delaware Filed May 17, 1961, Ser. No. 110,681
7 Claims. (Cl. 317—234)

This invention relates to semiconductor devices, particularly diodes, having improved contact structures for making electrical connections to the semiconductor.

A common type of semiconductor diode consists essentially of a tiny, monocrystalline body or die of semiconductor that is mostly of one conductivity type (P or N) and contains a substantially smaller region of the opposite conductivity type, with electrical connections to both regions. Electrical connection to the larger regions may comprise a metal electrode coated onto and covering substantially all of one surface of the semiconductor; this electrode is often soldered onto the mounting structure that serves as a mechanical support, an electrical connection, and a heat sink. Connection to the smaller region, which may extend to the opposite surface in an area as small as one square mil, or at most a few square mils, presents greater difficulties, particularly when the diode is to be encapsulated in a standard glass envelope requiring a blind assembly between the diode and the lead to this smaller region.

In a commonly used diode and contact structure, the upper lead comprises an S-shaped spring, which presses against a raised part of the diode. Although subject to certain problems hereafter discussed, such as vibration, this type of connection is fairly easy to make in the case of alloyed-junction diodes, wherein the process of manufacture leaves a metal button upon the top of the semiconductor. This button serves as a contact and provides the raised part needed for engagement with the spring. In the case of mesa diodes, the semiconductor itself is so etched that the region to be contacted is at the top of a slightly raised area, or mesa, on the top surface of the semiconductor. Thus, a mesa diode also has, as a result of its manufacture, a slightly raised part that can be contacted by the lead spring; but the result is somewhat less satisfactory than in the alloyed-junction case because of the small size of the mesa and its minute elevation above the remainder of the semiconductor surface. In the case of diffused junction diodes of planar configuration (i.e., the upper surface of the semiconductor, including the area over the smaller region which must be contacted, is essentially flat), the connection problem is even more difficult because the process of manufacture leaves no raised portion to be contacted by the spring—in fact, the area to be contacted may be defined by a hole through an insulating, oxidized layer of semiconductor that covers the remainder of the surface.

As a first step towards solving these difficulties, we place a small metal ball upon the small area that is to be contacted, for making electrical connection to the smaller region of the semiconductor. This provides a relatively large, raised part that is easily contacted by the lead spring, even though this contact must be made as a blind assembly in the encapsulation of the device.

However, two problems remain: the ball may become dislodged from its position in contact with the desired area of the semiconductor; and vibration may cause difficulties at the contact between the ball and the spring, particularly if the vibration has a component at the resonant frequency of the spring. These difficulties are solved by one or, preferably, both of the following means: the ball is secured to the smaller region of the semiconductor by a weld; and the electrical lead is secured to the ball by solder, as is hereinafter more fully described. It will be appreciated that the weld must be accomplished without damage to the semiconductor, particularly, the recitifying junction between the two regions of opposite conductivity type, and that the soldering must be accomplished also without damage to the semiconductor after the ball and the spring are brought into engagement in a blind assembly operation during encapsulation within the small glass envelope.

The invention may be understood better from the following illustrative description and the accompanying drawings.

FIG. 1 of the drawings is a greatly enlarged, somewhat schematic elevation of a diode and contact structure embodying this invention.

Figure 1:
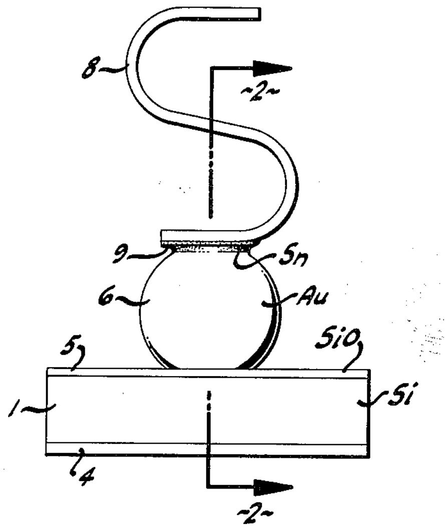
Figure 2:
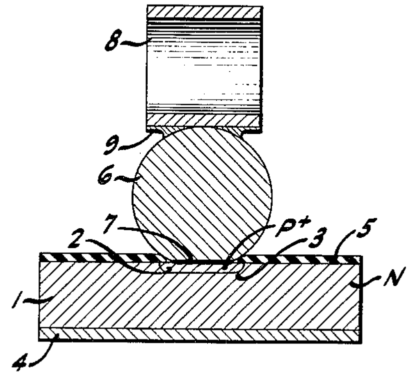
FIG. 2 is a section taken along the line 2—2 of FIG. 1.

Referring to FIGS. 1 and 2 of the drawings, a body 1 of semiconductor, e.g., silicon, is mostly of one conductivity type, e.g., N-type, and contains a much smaller region 2 of the opposite conductivity type, e.g., P+type, formed by the diffusion of an appropriate impurity into the semiconductor from a small area on its upper surface. Generally, the region 2 is much more heavily doped and has a much lower resistivity than the region 1, which is indicated by the + sign following the P. Between the two regions of opposite conductivity type, there is a tiny, pan-shaped, rectifying junction 3.

Electrical connection to the larger region 1 is made through a metal electrode 4 coated onto and covering substantially all of the lower surface of the semiconductor (herein surfaces are designated as upper and lower according to the orientation of the devices as shown in the drawings, although, of course, the finished device can be operated in any orientation). Usually, the diode is attached to a mounting structure (e.g., a part of the header) by soldering electrode 4 to the mounting structure, which also serves as an electrical connection and a heat sink.

The diode shown in FIGS. 1 and 2 is of planar configuration—that is, its upper surface and its lower surface are both essentially flat and parallel. Preferably, an oxidized layer 5 of the semiconductor covers substantially all of the upper surface except for a small area above region 2 defined by a hole through the oxidized layer. In fact, region 2 may be formed by first photo-engraving the hole through the oxide layer 5, and then diffusing a suitable impurity, e.g., boron, through this hole to form the region 2. Because the boron diffuses somewhat in the lateral direction as well as down into the semiconductor, the edges of junction 3 lie under the oxide layer 5 and are thus protected by the oxide, which is one of the advantages of the planar configuration.

Electrical connection to region 2 is made through a ball 6 of an appropriate metal, e.g., gold. Preferably, ball 6 is of larger diameter than the hole through oxide layer 5 and sits in the hole through the oxide layer, so that the bottom of the ball is substantially centered upon and in contact with the area on the surface of the semiconductor at the top of region 2. The oxidized layer 5 is a good electrical insulator and insures that the ball 6 cannot short the PN junction 3. Ball 6 is joined to region 2 of the semiconductor by a weld 7. The ball is made of a metal that forms a eutectic with the semiconductor used at a temperature above the maximum operating temperature of the diode, and substantially below the melting points of both the metal and the semiconductor. When the semiconductor is silicon, the presently preferred material, the preferred metal for ball 6 is gold. The silicon-gold eutectic has a melting point of about 380 degrees C., which is sufficiently high that is does not limit the operating temperature of the diode, and yet is sufficiently low that welding of the gold ball to the semiconductor is easily accomplished without damage to the structure. Tin may also be a useable metal for ball 6 in some cases.

After the ball has been placed in position on top of region 2, a pulse of electric current is passed through the ball and semiconductor. This pulse of current is experimentally adjusted to a magnitude and duration such that the area of contact between the ball and the semiconductor is heated above the melting point of the eutectic, but not above the melting point of the metal of which the ball is made or the melting point of the semiconductor. At this temperature, a thin layer of molten eutectic forms between the metal ball and the semiconductor, and after termination of the electric pulse, this molten layer quickly solidifies and forms a secure weld between the ball 6 and region 2 of the semiconductor.

In addition to providing a secure mechanical attachment between the ball and the semiconductor, the weld 7 provides a good, ohmic, electrical connection between the ball 6 and region 2. The electrical lead 8, which makes electrical connection to ball 6, may be an S-shaped metal spring of the type heretofore used in diode and contact structures, except that, according to the present invention, a layer of solder 9 is coated onto at least the bottom surface of lead 8. The solder may be of tin or its alloys, or may be a silver solder. During encapsulation of the diode in a conventional glass envelope, spring 8 is pressed down upon the top of ball 6 in a blind assembly, and thereafter the compression of the spring tends to hold parts 6 and 8 together in good electrical contact.

As has already been explained, in prior art assemblies using a spring-metal lead of this type, difficulty has arisen in the presence of vibration at the mechanical resonant frequency of the spring, which causes the spring to bounce against the part that it contacts, and in some cases to break. By providing the layer of solder 9, as herein explained, this difficulty is overcome. During encapsulation, the heat normally used in the encapsulating process, or additional heat applied if necessary, melts the layer of solder 9 sufficiently for it to adhere to ball 6 and form a firm, soldered joint securing the lead 8 to the ball 6. Thus a sufficiency firm mechanical joint is formed to prevent the lower end of spring 8 vibrating and bouncing on the top of ball 6, and also the electrical connection between the lead 8 and the ball 6 is improved.

Figure 3:
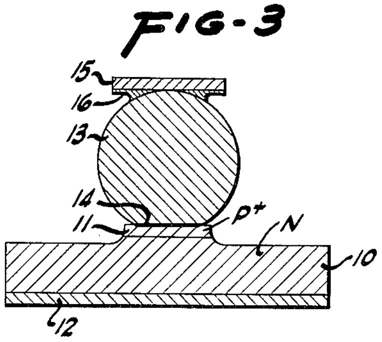
FIG. 3 is a section of another embodiment.

Although particularly valuable for making contact to planar semiconductor devices, the invention is also useful with devices having the mesa configuration. In FIG. 3, there is shown a monocrystalline body of semiconductor 10, mostly of N-conductivity type. The upper surface of the semiconductor has been etched, in the well-known manner, to form a tiny raised area, or mesa, containing a region 11 of P+ conductivity type. Metal electrode 12, coated on and covering substantially all of the bottom surface of the semiconductor, provides electrical contact to the larger N-type region. Contact with the smaller P+ region 11 is made by means of a gold ball 13 centered on top of and in contact with the raised area of the upper surface. Ball 13 is joined to the smaller region of semiconductor by means of a weld 14 formed in the manner hereinbefore described. Electrical lead 15 is connected to the top of ball 13 and is secured thereto by a layer of solder 16 adherent to the underside of lead 15 and the top of ball 13.

An additional feature and advantage of the invention herein disclosed is that it makes possible a reduction of lead inductance for the fabrication of devices operating at exceptionally high frequencies. In general, the least inductance that a lead can have decreases as the cross-section of the lead increases—therefore it is desirable that the cross-section of the lead be relatively large rather close to the rectifying junction. On the other hand, high-frequency operation demands a small junction for the purpose of keeping the capacitance low. An advantageous structure is shown in FIG. 4.

Figure 4:
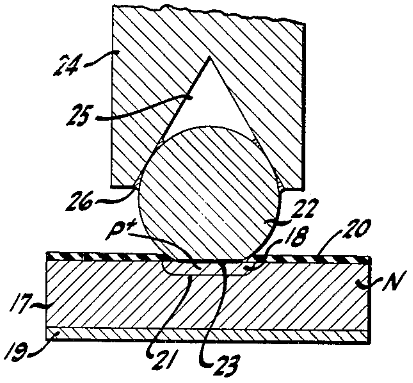
FIG. 4 is a section of still another embodiment.

Referring to FIG. 4, a monocrystalline body of semiconductor 17 is mostly of one conductivity type, e.g., N, and contains a substantially smaller region 18 of the opposite conductivity, e.g., P+. A metal electrode 19 is coated upon and covers substantially all of the lower surface of the semiconductor. In the desirable planar configuration illustrated, the upper surface of the semiconductor is essentially flat and parallel to the lower surface. Preferably, an oxidized layer 20 of the semiconductor covers and protects substantially all of the upper surface except the small area on top of region 18, which is defined by a hole through the oxidized layer. The pan-shaped rectifying junction 21, preferably formed by diffusion through the hole in the oxidized layer, has an edge under and fully protected by the oxide. Ball 22 is centered upon and in contact with the surface area at the top of the smaller region 18 of the semiconductor, and is securely joined thereto by means of a weld 23 formed in the manner hereinbefore described.

Electrical connection to the ball is made by means of a lead 24 of relatively large cross-section. For example, the lead 24 may be a metal rod extending downward onto the top of ball 22 and containing in its end a recess 25 which receives the upper portion of the metal ball. A bit of solder 26 can be used to insure a permanent, good electrical connection between the lead 24 and the ball 22.

As has already been mentioned, the junction 21 is preferably of small area in order to maintain a low capacitance for high-frequency operation. Its size is accurately determined by the size of the hole through oxide layer 20, through which an impurity is diffused to form the region 18. In actual practice, the lateral diffusion of the impurity forms the junction 21 a very small distance back from the edge of the hole in the oxide layer, and the area of the junction is approximately equal to the area on the surface of the semiconductor defined by the hole through the oxide. Ball 22 is of larger diameter than either the hole through the oxide or the junction. For example, the hole through the oxide layer may be one mil in diameter, and the junction 21 may be of approximately the same size, while the ball 22 may be 8 mils in diameter. Lead 24 may be a metal rod of substantially larger diameter than ball 22—in fact, the lead 24 may be as large in cross-section as one desires. Thus, the cross-section of the electrical lead increases by a large amount relatively close to the rectifying junction, and thus provides a very desirable configuration for high-frequency operation.

In its broader aspects, the invention is not limited to the specific examples illustrated and described; changes and modifications can be made without departing from the inventive principles disclosed.

What is claimed is:

1. A semiconductor device comprising a body of semiconductor containing at least two regions of different conductivity types, one region being substantially smaller than the other, said smaller region and said larger region both extending to a common, planar surface area of said body, a metal ball in ohmic contact with said smaller region at said surface area but free from contact with said larger region, a current weld joining said ball to said smaller region of the semiconductor, and an electrical connection to said ball.

2. A semiconductor device comprising a body of semiconductor containing at least two regions of different conductivity types, one region being substantially smaller than the other, said smaller region and said larger region both extending to a common, planar surface area of said body, a metal ball in ohmic contact with said smaller region at said surface area but free from contact with said upper region, an electrical lead connected to said ball, and a bit of solder securing said lead to said ball.

3. A diode comprising a monocrystalline body of semiconductor having a first surface and a second planar surface, an electrode in contact with substantially all of said first surface, said body being mostly of one conductivity type and containing a substantially smaller region of the opposite conductivity type, said smaller region extending to an area of said second planar surface, a metal ball in ohmic contact with said area but free from contact with said larger area, a current weld joining said ball to said smaller region of the semiconductor, an electrical lead connected to the top of said ball, and a layer of solder on said lead, said solder adhering to said lead and said ball and securing said lead to said ball.

4. A diode as in claim 3, said metal being one that forms a eutectic with said semiconductor at a temperature above the maximum operating temperature of the diode and substantially below the melting points of both the metal and the semiconductor.

5. A diode as in claim 3, wherein the semiconductor is silicon and the metal ball is gold.

6. A diode comprising a monocrystalline body of semiconductor having parallel, planar upper and lower surfaces, a metal electrode in contact with substantially all of said lower surface, an insulating, oxidized layer of the semiconductor covering substantially all of said upper surface except for an area defined by a hole through the oxidized layer, said body of semiconductor being mostly of one conductivity type and containing a substantially smaller region of the oppoiste conductivity type, said smaller region being the region immediately below and extending to said area defined by the hole through the oxidized layer, a metal ball of larger diameter than the hole through the oxidized layer, said ball being substantially centered upon and in ohmic contact with said area defined by the hole but free from contact with said larger region, a current weld joining said ball to said smaller region of the semiconductor, a metal-spring electrical lead arranged to press down upon the top of said ball, and a layer of solder upon said lead, said solder adhering to said lead and said ball and securing said lead to said ball.

7. A diode comprising a monocrystalline body of semiconductor having an upper planar surface and a lower surface, an electrode in contact with substantially all of said lower surface, said body being mostly of one conductivity type and containing a substantially smaller region of the opposite conductivity type, said smaller region extending to an area of said upper planar surface, a metal ball in ohmic electrical contact with said area, but free from contact with said larger region, and an electrical lead in contact with the upper portion of said ball, said lead being larger in cross-section than said ball and a layer of solder on the underside of said lead, said solder adhering to said lead and said ball and securing said lead to said ball.

References Cited by the Examiner

UNITED STATES PATENTS

| | | | |
|---|---|---|---|
| 2,631,356 | 3/1953 | Sparks et al. | 29—25.3 |
| 2,728,881 | 12/1955 | Jacobi | 317—236 X |
| 2,875,505 | 3/1959 | Pfann | 29—25.3 |
| 2,888,618 | 5/1959 | Lockett | 317—234 |
| 2,934,685 | 4/1960 | Jones | 317—235 |
| 2,981,877 | 4/1961 | Noyce | 317—235 |
| 3,047,781 | 7/1962 | Eannarino | 315—234 |
| 3,050,666 | 8/1962 | Stump | 317—234 |
| 3,064,167 | 11/1962 | Hoerni | 317—234 |
| 3,067,485 | 12/1962 | Ciccollela et al. | 317—235 |

JOHN W. HUCKERT, *Primary Examiner.*

JAMES D. KALLAM, *Examiner.*

A. S. KATZ, R. SANDLER, *Assistant Examiner.*